United States Patent
Hoelscher et al.

(10) Patent No.: US 9,385,620 B1
(45) Date of Patent: Jul. 5, 2016

(54) AC LINK CONVERTER SWITCH ENGINE

(71) Applicant: Lockheed Martin Corporation, Grand Prairie, TX (US)

(72) Inventors: David Louis Hoelscher, Arlington, TX (US); Em Hoang, Trophy Club, TX (US); Gregory George Romas, Jr., Coppell, TX (US); Brad Clinton Ortloff, Arlington, TX (US); Jatin Nikul Mehta, Arlington, TX (US); Daniel Homiak, Waxahachie, TX (US)

(73) Assignee: Lockheed Martin Corporation, Grand Prairie, TX (US)

( * ) Notice: Subject to any disclaimer, the term of this patent is extended or adjusted under 35 U.S.C. 154(b) by 503 days.

(21) Appl. No.: 13/738,721

(22) Filed: Jan. 10, 2013

(51) Int. Cl.
    *H02M 5/458* (2006.01)
    *H02M 7/04* (2006.01)
    *H02M 5/45* (2006.01)

(52) U.S. Cl.
    CPC ................ *H02M 5/458* (2013.01); *H02M 5/45* (2013.01); *H02M 7/04* (2013.01)

(58) Field of Classification Search
    CPC ......... H02M 5/22; H02M 5/225; H02M 5/45; H02M 5/458
    USPC ...................................... 363/35, 37, 131–134
    See application file for complete search history.

(56) References Cited

U.S. PATENT DOCUMENTS

| | | | | |
|---|---|---|---|---|
| 4,310,866 A * | 1/1982 | Wirth | ............................... | 361/88 |
| 4,833,586 A * | 5/1989 | Inaba | .................. | H02M 5/4505 318/811 |
| 4,870,556 A * | 9/1989 | Inaba | ................ | H02M 7/53873 363/37 |
| 5,155,671 A * | 10/1992 | Inaba | .................. | H02M 5/4585 363/37 |
| 5,208,740 A | 5/1993 | Ehsani | | |
| 6,021,052 A | 2/2000 | Unger et al. | | |
| 7,092,265 B2 * | 8/2006 | Kernahan | ........................ | 363/65 |
| 7,738,271 B1 | 6/2010 | Argo | | |
| 7,944,717 B2 | 5/2011 | Sakakibara | | |
| 7,952,896 B2 * | 5/2011 | Hu | ....................... | H02M 5/4585 363/37 |
| 8,076,797 B2 | 12/2011 | Kramer et al. | | |
| 8,111,056 B2 | 2/2012 | Manabe et al. | | |
| 8,125,177 B2 | 2/2012 | Rider et al. | | |
| 9,042,131 B2 * | 5/2015 | Barron | .................... | H02M 1/08 363/37 |
| 2007/0159858 A1 | 7/2007 | Spindler et al. | | |
| 2008/0013351 A1 | 1/2008 | Alexander | | |
| 2008/0304296 A1 | 12/2008 | NadimpalliRaju et al. | | |
| 2009/0225569 A1 | 9/2009 | Begalke | | |
| 2010/0117591 A1 * | 5/2010 | Thomas et al. | ............... | 320/101 |
| 2011/0211370 A1 * | 9/2011 | Luo | ................... | H02M 3/33592 363/21.02 |
| 2011/0254494 A1 * | 10/2011 | Briane | ................ | B60L 11/1811 318/503 |
| 2011/0292697 A1 * | 12/2011 | Alexander | ....................... | 363/37 |
| 2011/0299308 A1 * | 12/2011 | Cheng | ..................... | H02M 1/44 363/37 |
| 2012/0008349 A1 | 1/2012 | Scharf | | |
| 2012/0320641 A1 * | 12/2012 | Chapman | ................. | H02J 3/383 363/37 |
| 2013/0033907 A1 * | 2/2013 | Zhou | ....................... | H02M 1/12 363/37 |
| 2013/0155730 A1 * | 6/2013 | Reichard | ............... | H02M 5/453 363/37 |
| 2013/0188399 A1 * | 7/2013 | Tang | ..................... | H02M 3/335 363/21.1 |

* cited by examiner

Primary Examiner — Gary L Laxton
Assistant Examiner — Kyle J Moody
(74) Attorney, Agent, or Firm — Withrow & Terranova, PLLC

(57) ABSTRACT

A multiport AC link converter includes a resonant AC link, an input port, an output port, and a plurality of switches. A first subset of the switches is between the input port the resonant link and a second subset of the switches is between the resonant link and the output port. The switch sequencing for the input port is selected and executed independently of the switch sequencing for the output port the switch sequencings for the output port is selected and executed independently of that for the input port.

13 Claims, 5 Drawing Sheets

Switch Combination Table

| Seq 1 | 1 | 2 | 3 | 4 | 5 | 6 | 7 | 8 | 9 | 10 |
|---|---|---|---|---|---|---|---|---|---|---|
| Seq 2 | 1 | 2 | 3 | 4 | 5 | 6 | 7 | 8 | 9 | 10 |
| Seq 3 | 1 | 2 | 3 | 4 | 5 | 6 | 7 | 8 | 9 | 10 |
| Seq 4 | 1 | 2 | 3 | 4 | 5 | 6 | 7 | 8 | 9 | 10 |
| Seq 5 | 1 | 2 | 3 | 4 | 5 | 6 | 7 | 8 | 9 | 10 |
| Seq 6 | 1 | 2 | 3 | 4 | 5 | 6 | 7 | 8 | 9 | 10 |
| Seq 7 | 1 | 2 | 3 | 4 | 5 | 6 | 7 | 8 | 9 | 10 |
| Seq 8 | 1 | 2 | 3 | 4 | 5 | 6 | 7 | 8 | 9 | 10 |

*FIG. 4A*

Voltage Comparison Type Table

| Seq 1 | 1 | 2 | 3 | 4 | 5 | 6 | 7 | 8 | 9 | 10 |
|---|---|---|---|---|---|---|---|---|---|---|
| Seq 2 | 1 | 2 | 3 | 4 | 5 | 6 | 7 | 8 | 9 | 10 |
| Seq 3 | 1 | 2 | 3 | 4 | 5 | 6 | 7 | 8 | 9 | 10 |
| Seq 4 | 1 | 2 | 3 | 4 | 5 | 6 | 7 | 8 | 9 | 10 |
| Seq 5 | 1 | 2 | 3 | 4 | 5 | 6 | 7 | 8 | 9 | 10 |
| Seq 6 | 1 | 2 | 3 | 4 | 5 | 6 | 7 | 8 | 9 | 10 |
| Seq 7 | 1 | 2 | 3 | 4 | 5 | 6 | 7 | 8 | 9 | 10 |
| Seq 8 | 1 | 2 | 3 | 4 | 5 | 6 | 7 | 8 | 9 | 10 |

*FIG. 4B*

Error Comparison Type Chart

| Seq 1 | 1 | 2 | 3 | 4 | 5 | 6 | 7 | 8 | 9 | 10 |
|---|---|---|---|---|---|---|---|---|---|---|
| Seq 2 | 1 | 2 | 3 | 4 | 5 | 6 | 7 | 8 | 9 | 10 |
| Seq 3 | 1 | 2 | 3 | 4 | 5 | 6 | 7 | 8 | 9 | 10 |
| Seq 4 | 1 | 2 | 3 | 4 | 5 | 6 | 7 | 8 | 9 | 10 |
| Seq 5 | 1 | 2 | 3 | 4 | 5 | 6 | 7 | 8 | 9 | 10 |
| Seq 6 | 1 | 2 | 3 | 4 | 5 | 6 | 7 | 8 | 9 | 10 |
| Seq 7 | 1 | 2 | 3 | 4 | 5 | 6 | 7 | 8 | 9 | 10 |
| Seq 8 | 1 | 2 | 3 | 4 | 5 | 6 | 7 | 8 | 9 | 10 |

*FIG. 4C*

AC LINK CONVERTER SWITCH ENGINE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This section introduces information from the art that may be related to or provide context for some aspects of the technique described herein and/or claimed below. This information is background facilitating a better understanding of that which is disclosed herein. This is a discussion of "related" art. That such art is related in no way implies that it is also "prior" art. The related art may or may not be prior art. The discussion is to be read in this light, and not as admissions of prior art.

An AC link power converter is, in general, a device that converts an input power signal to meet the operating requirements of an electrical load. The conventional AC Link power converter firmware is programmed to operate specifically with a single type of input and output. Any change in input characteristics or output characteristics requires significant rework of the firmware. Additionally, the existing firmware only supports single-input/single-output operation. Multiport capabilities are not supported. Switching order and selection in conventional AC Link power converters is hardcoded into the firmware, requiring complete firmware redesign for every application.

More particularly, changes in input and/or output have required an intensive firmware rework effort for each type of converter. Existing switching logic for three-phase AC-DC, single phase AC-DC, and DC-DC converters are all substantially different and do not lend themselves to use in new converter configurations. Any modifications or changes (such as handling an inverted DC voltage) required a substantial reprogramming and debugging effort. Other configurations, such as performing AC-AC conversion or multiport operation have not even been attempted because of the complexity involved.

The presently disclosed technique is directed to resolving, or at least reducing, one or all of the problems mentioned above. Even if solutions are available to the art to address these issues, the art is always receptive to improvements or alternative means, methods and configurations. Thus, there exists and need for a technique such as that disclosed herein.

SUMMARY

In a first aspect, a multiport AC link converter comprises: a resonant AC link; an input port; an output port; a plurality of switches, a first subset of which are between the input port and the resonant link and a second subset of which are between the resonant link and the output port; and a switch control that, in operation, selects switch sequencing and executes the selected switch sequencing for the input port independently of the output port and for the output port independently of the input port.

In a second aspect, a multiport AC link converter, comprises: a resonant AC link; an input port; an output port; a plurality of switches, a first subset of which are between the input port the resonant link and a second subset of which are between the resonant link and the output port; and means for: selecting a switch sequencing for the input port and for the output port; and executing the selected switch sequencings; wherein the selecting and executing for the input port is performed independently of the output port and for the output port is performed independently of the input port.

In a third aspect, a method for use in operating a multiport AC link converter, comprising: determining a set of energy level adjustments for the input port and for the output port; determining a set of desired energy transfers to effectuate the determined energy level adjustments; selecting a switch sequencing for the input port and the output port, each selection being made independent of the other, to implement the determined energy transfers; executing the selected switch sequencings, each execution being performed independent of the other; and iterating the above for each link cycle.

The above presents a simplified summary of the presently disclosed subject matter in order to provide a basic understanding of some aspects thereof. The summary is not an exhaustive overview, nor is it intended to identify key or critical elements to delineate the scope of the subject matter claimed below. Its sole purpose is to present some concepts in a simplified form as a prelude to the more detailed description set forth below.

BRIEF DESCRIPTION OF THE DRAWINGS

The invention may be understood by reference to the following description taken in conjunction with the accompanying drawings, in which like reference numerals identify like elements, and in which:

FIG. 4A-FIG. 4C more clearly depict the tables of FIG. 3.

Figure 1:
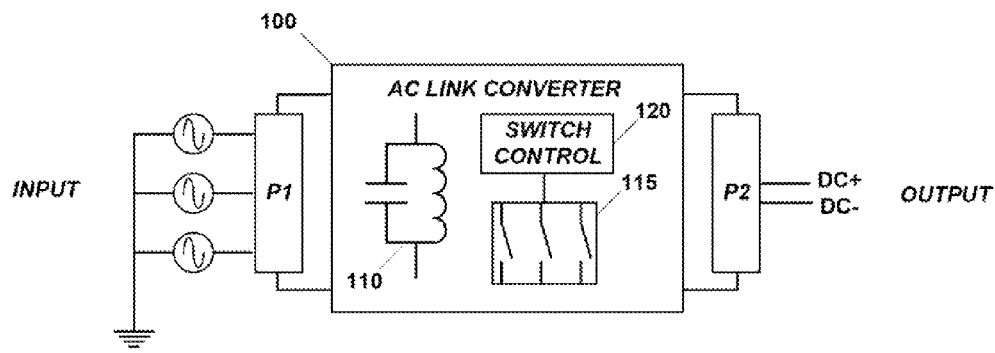
FIG. 1 conceptually illustrates an AC link converter in accordance with once particular aspect of the present disclosed technique.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which vary from one implementation to another. Moreover, it will be appreciated that such a development effort, even if complex and time-consuming, would be a routine undertaking for those of ordinary skill in the art having the benefit of this disclosure.

The illustrated embodiments are described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention.

The presently disclosed technique includes a new firmware architecture for AC link converter operation that handles per-port functionality independently by separating switching code from data. That is, the technique decouples the switching operations from the port specific data. This permits one to easily add, remove, and change ports, because each port manages its own switching and requires only minimal system-wide information (and no specific information about other ports).

In the illustrated embodiments, there is a single module called "current tracker and integrator" that has a minimal interface and is a shared resource among all ports. Implementations for AC, DC, and other port types are individually encapsulated in separate modules that operate by progressing along a sequence that is selected from a set of lookup tables or other data structures. Such tables might include, for example, a switch combination table, a voltage comparison type table, and an error comparison type table. In the illustrated embodiment, the data tables which specify abstract switch sequences, abstract voltage comparisons, and abstract error references.

The modular approach described herein permits one to easily re-use the port modules to support rapid development of converter solutions for a variety of applications, and also facilitates the possibility of dynamically changing port types while the converter is running. For example, changing from a two-port AC-AC configuration to a three-port AC-DC-DC operation would not require the development of dedicated switching logic. Instead, the AC, DC, and DC functionality is contained in existing code modules and plugs into the system through minimal interfaces. Those minimal interfaces include input from the error calculator, tie-in to the current tracker/integrator, and mapping of physical switches to the port switch signals as described further below.

More particularly, in this technique an advanced switch engine implements a number of capabilities while reducing development time and effort for future converters. The implemented capabilities include, but are not limited to, dynamically switching between output voltage/output current control; supporting imbalanced phase loading; performing phase imbalance correction; performing phase synthesis (generating three phase AC from single phase AC); performing solar maximum power point tracking; and interacting with vehicle and DC bus batteries. Note that not all embodiments will necessarily manifest all these capabilities and, to the extent they do, they may manifest them to different degrees.

The illustrated embodiment more particularly includes three tables for a three-phase AC port and three tables for a DC port. During each switching operation, each port will attempt to transfer target amounts of energy. The timing of the transfer is performed by making progress through conditionally selected sequences from the data tables. The tables can be re-used for future converter efforts. It is straightforward (for example) to make a three-phase AC-three-phase AC-DC converter because each port is treated independently.

Turning now to FIG. 1, an AC link converter 100 between two ports P1 and P2 is shown. Those in the art will appreciate that FIG. 1 is highly conceptualized. The AC link converter 100 includes a resonant link 110, a plurality of switches 115. Those in the art will appreciate that switches 115 will be found on both the input end and the output end of the AC link converter 100. The precise positioning and relationships of the switches will be implementation specific in a manner that will be apparent to those in the art. The operation of the switches 115 is controlled by the switch control 120, described further below.

The input to port P1 is a three-phase AC signal and the output from port P2 is a DC signal. As is apparent from the disclosure elsewhere herein, the technique is not limited to such a conversion. The technique is applicable to any kind of conversion to which AC link converters are generally applicable. Similarly, the technique disclosed herein is not limited to two ports as shown. The technique actually scales quite well and those in the art having the benefit of the teachings herein will be able to extrapolate to embodiments including multiple ports for input and/or output.

Figure 2:
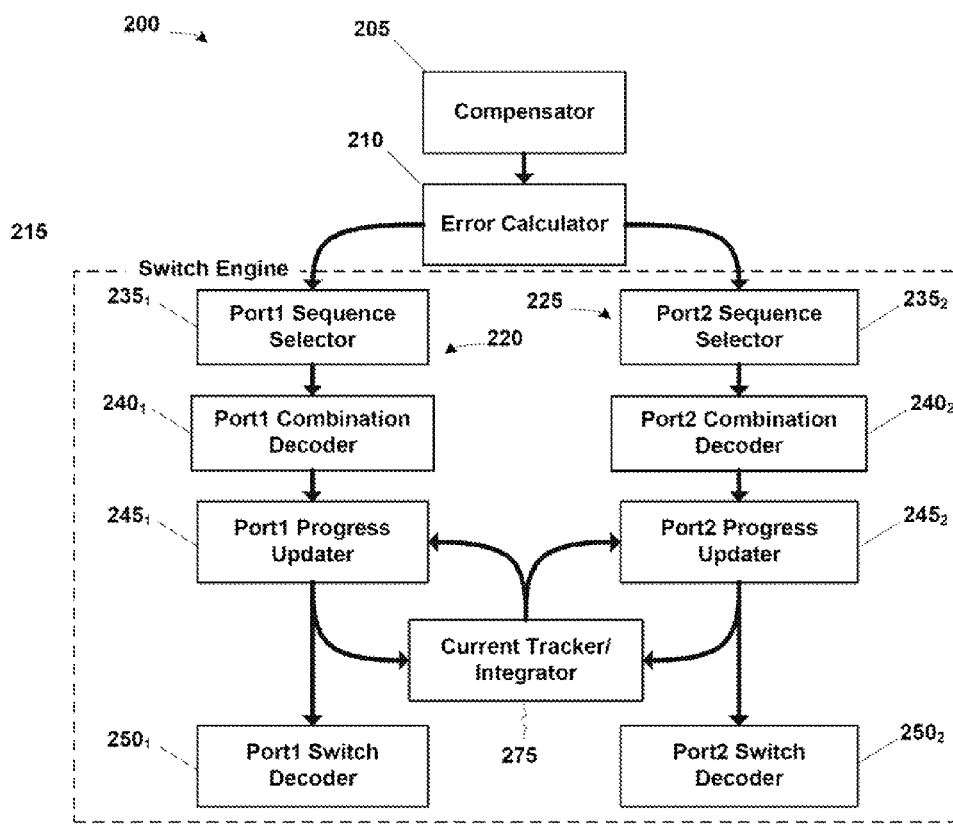
FIG. 2 shows how these common elements of the switch control are shared among multiple ports in the embodiment of FIG. 1 for a link cycle.

The switch control 120 comprises a "switching engine" 215, shown in FIG. 2, that interacts with each port through a common, minimal interface. Aside from a few simple signals, the only low-level information that must be kept in common among all ports P1, P2 (or more) is the instantaneous current and voltage of the resonant AC link 110. (This data may be acquired in accordance with conventional practice.) As the voltage is a measured value, there is no need for any stateful logic to handle it, but because the current is calculated, control logic is used to constantly update the link current value. At a high level, the only shared requirement is that within the course of a link cycle the total energy added to and removed from the link sums to zero (neglecting losses).

FIG. 2 shows how these common elements are shared among multiple ports, e.g., ports P1, P2. The simple signals/flags are handled in a module called "recycle manager" which is not shown in FIG. 2. At the start of each link cycle 200, a digital control loop/compensator 205 determines the energy level adjustments for the ports for the present link cycle 200. This includes evaluating the voltage and/or current of each port and determines how much current needs to be added or removed from each of the monitored port phases to correct for measured errors. These errors may be introduced because of a moving reference (e.g., moving along a reference three-phase sine wave, the target voltage changes) or because of loads which may affect output voltage levels.

Regardless of the source of errors, the converter logic uses application-specific logic to determine a desired set of energy transfers. These energy transfers are intended to achieve the desired changes in output current. This "shuffling" of energy transfers occurs in the Error Calculator 210, which ensures that the sum of energy transfers remains zero, taking into account that some energy will be lost to inefficiencies. Once the planned energy transfers have been calculated, the switching engine 215 receives the energy transfer amounts and assigns them to their specific port for the upcoming link cycle.

From this point forward that each port operates largely independently, executing the energy transfers in a self-ordering fashion as shown by the two branches 220, 225. Using the sign of the energy transfers (i.e., whether the phases in question will be accepting power or delivering power) and the sign of the phase voltages, each port P1, P2 selects a sequence of events to follow for the upcoming link cycle. This is performed by the respective port sequence selectors $235_1$, $235_2$. The sequence only includes actions (turning switches on/off) for the port in question. All available sequences are stored as data as discussed further below. They are processed in a similar manner by progressing through the sequences. Each port P1, P2 progresses through their respective sequences at a different rate, based upon conditions for each step that are also stored as data.

Figure 3:
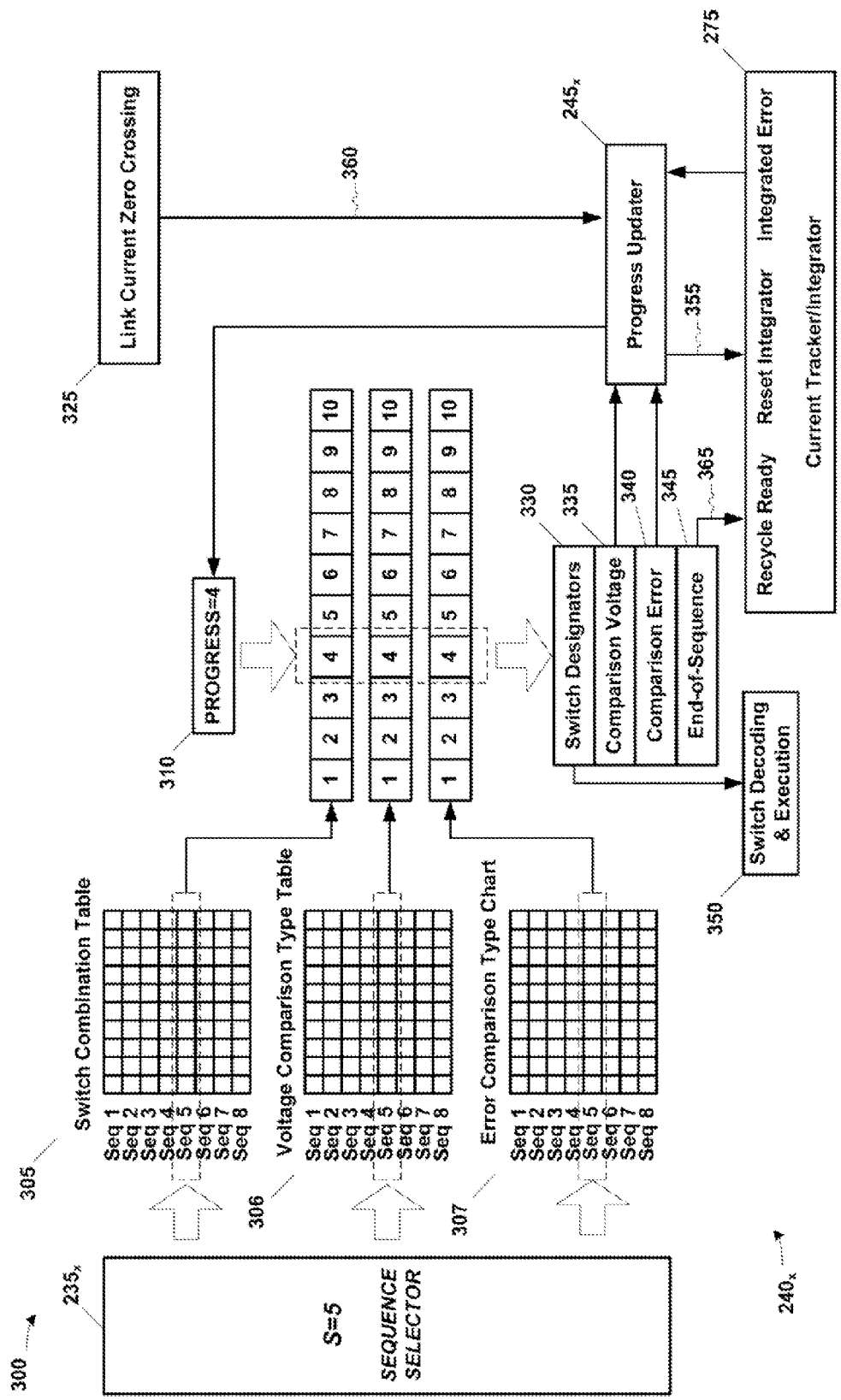
FIG. 3 illustrates the process of selecting and executing a port sequence for the AC link converter of FIG. 1.

The process 300 of selecting and executing a sequence for a port is graphically illustrated in FIG. 3. The process 300 employs stored data in a plurality of tables 305-307. The data tables 305-307 are previously generated for a given port type and contain variable-length sequences, and so the data is determined a priori, or is predetermined. In the illustrated embodiment, the port sequencer 235x has determined that the sign of the energy transfers and phase voltages indicate that the fifth sequence is to be selected and executed. The sequence number is used to extract sequence information for: switch combinations—i.e., which switches should be on during each progress step—using table 305; voltage comparison—i.e., what voltage comparisons should be met before moving to the next progress step—using table 306; and error/energy comparisons—i.e., how much energy should be transferred before moving to the next progress step—using table 307.

There is also a fourth table (not shown) in the illustrated embodiment containing information about the voltage comparison that will be made in the next progress step. The comparison, or "next voltage comparison", is performed on values that are the contents of the voltage comparison table 306 shifted back by one progress step, or link cycle. This information may be useful in some embodiments. Alternatively, one may instead "look ahead" in the existing table to the next entry. However, a fourth table can be easier to implement for reasons of implementation consistency.

The number of tables used in any particular embodiment is implementation-specific. Some embodiments may have as few as one table per port if each entry in the table contains all the different types of information. Other kinds of data structures may be used in alternative embodiments. For example, data structures like a database record, or an object with different types of data members (similar to object oriented programming) may be used instead of a table and will include multiple data entries per record. Or a single table with each entry including the relevant information may be used. The illustrated embodiment uses separate tables for ease of use, to reduce size, and to encode the data.

The data in the table is stored in a compact, encoded format, and is decoded using the port combination decoders $240_1$, $240_2$ (shown in FIG. 2) to map to specific switches and input voltage measurements within the port-specific logic. Furthermore, the encoding may have a level of indirection: instead of referencing phase A, B, and C of a three-phase AC port, it may be preferable to abstractly refer to the phases as Dominant (the phase with the largest voltage magnitude), First, and Second (the phase with the smallest voltage magnitude), and let the port-specific logic handle the real-time mapping to specific physical switches.

As progress is made through each sequence together (within a port), the switches to be expressed and the conditions to make further progress will change. In order to make progress through the sequence, both the voltage comparison and the error/energy comparison must be met. Progress through the sequence is tracked by a progress index 310. Progress is tracked using the progress updater $245_x$ (shown in both FIG. 2 and FIG. 3) in the manner described below.

Generally, the switch combinations indicated by the active sequence (eg., S=4) and progress step (e.g., progress=4) will be expressed at all times, and the content of the data table is responsible for ensuring that the switches are in a state that will allow progress during the link cycle.

Referring again to FIG. 3, the switch designators 330, comparison voltage 335, comparison error 340, and end-of-sequence 345 are the values, information, and flags that are extracted from the tables 304-306 based on the presently selected sequence and current progress step. The switch designators 220 are generally abstract switch references that are decoded and executed by the switch decoding an execution 350. This means that the table information is used in combination with measured or calculated values to determine how to map that table information to physically implemented switches 115.

Each particular implementation varies with the port type (three or single phase AC, DC, bipolar DC, etc.) with varying levels of complexity. As discussed elsewhere, the switch logic 120 is implemented in an FPGA in the illustrated embodiment. The execution portion of the switch decoding and execution 350 may do more than simply affect the output pins of the FPGA (which control the switch driver circuitry). In one embodiment, telemetry data from each switch driver may be used to ensure that the switching event is carried out in a timely manner, and to shutdown (or take other preventative measures) if unexpected operation occurs while executing the switch event.

The converter 100 has one resonant AC link storage element. The converter 100 calculates the effective current in the AC resonant link 110, which indicates what the inductively stored energy is. Thus, the effective current is tracked by the current tracker/integrator 275. More particularly, the current tracker/integrator continually integrates the voltage of the AC resonant link 110. The compensator 205 (a digitally implemented feedback control loop), shown in FIG. 2, creates an output representing how much energy has existed on the input, and thus how much energy must be transferred in the next AC Link cycle (that is, the next executed sequence from the table). The amount of these energy transfers are referred to as "errors".

The job of the converter switch engine 215 is to translate these "errors" into specific operating instructions for the switches 115. The operations of interest are a series of conduction events; wherein a set of switches turn on in a way that connects an external phase to the resonant AC link 110 at specific times. Such times include when the external phase voltage equals the internal link voltage, to ensure soft, efficient switching. It is not material whether the external phase is AC or DC. The external phase is at a known voltage, and the conduction event can be one that either increases the energy in the AC resonant link 110 or decreases energy in the AC resonant link 110. This either decreases or increases energy from the external phases, respectively.

The switch engine 120 selects switching sequences that appropriately add or remove energy from the phases to try to correct the error in the phases, and it keeps track of the energy transferred during each individual conduction by integrating the voltage across the AC resonant link 110 (ergo, "integrated error"). The integrated error is reset at the start of each cycle through the reset integrator signal 355.

In the illustrated embodiment, at the end of each link cycle is a "recycle" period. The switching engine 120 selects the highest voltage phase (among all ports) and uses it to push any remaining energy out of the AC resonant link 120. It then draws it back in, but with the current direction reversed to start the next cycle, and having received the Link Current Zero Crossing signal 360 to ensure accurate energy measurements. The recycle period happens only once at the end of a link cycle, so logic exists to select the highest voltage phase among all ports to on which to perform the recycle. This is a decision made across all available ports and so is part of the overall converter switching engine 120 as opposed to being a port-specific implementation.

There are a few such signals that exist at the converter engine level (spanning multiple ports), and Recycle Ready signal 365 is just one of them. However, they are an intentionally limited/small set of signals to effectively decouple the operation of one port from the operation another port. With so few signals, it is straightforward to add a third port of any type to the converter engine, or swap out one of the currently-implemented ports.

One aspect of this approach therefore is that it allows for decoupling across multiple ports so that progressing through a sequence is non-blocking. If there is a conduction actively occurring on an AC port, then the link voltage is held relatively constant at the AC port voltage. Thus, the AC port sequence will be waiting to make progress based on an energy transfer (because it will already have met the requirement to make progress based on voltage), while the DC port will be waiting for a voltage condition to be met (with no energy transfer requirement). After the AC port completes the conduction (during which time the link voltage does not change substantially) and make progress, a change in the expressed switches allows the link to continue resonating, at which point it may meet the DC port voltage constraint, allowing the DC sequence to make progress into a DC port conduction event. This approach is scalable to any number of ports.

Flags encoded in the table signal the end of a sequence. When all ports P1, P2 have indicated their flags for the end of the link cycle, all planned energy transfers for that link cycle will have been completed. Then a small amount of energy carried in the resonant link is "recycled" onto the highest magnitude phase voltage (because it was the last voltage seen by the monotonic link voltage) and the switch engine 210, shown in FIG. 2, waits for the end of the link cycle, indicated by a zero-current detection signal 360 measured by the Link Current Zero Crossing element 325 from the resonant link 110, shown in FIG. 1.

The embodiment of FIG. 1 and FIG. 2 applies to only two ports. However, the technique may be scaled to multiple ports in some embodiments. As noted above, the information in the tables 305-307 is dedicated to a particular port and so, consequently, there will be a set of tables 305-307 for each of the ports.

Furthermore, as discussed above, some of the data stored in the tables 305-307 is encoded and includes some indirection. Encoding is used to reduce the size of the data, which is a factor in the illustrated embodiments since they embody the switch control 120 in a field programmable gate array ("FPGA"). The encoding also facilitates the FPGA's interpretation. However, these are implementation specific details that may be omitted in some embodiments. Some embodiments may therefore omit one or more of the switch decoders shown in FIG. 2-FIG. 3.

The general rule nevertheless will be the use of encoding and decoding. For limited port-specific cases, encoding and decoding may be avoided. For example, with a DC port it is known that some switches are always connected to positive and others to negative Encoding/decoding is therefore not necessary in that circumstance. However, with a three-phase AC port it may be necessary to encode and decode because if the tables contain only abstract switch references as discussed elsewhere. In the illustrated embodiment, the DC port is utilizes encoding and decoding because it makes the data smaller and the implementation is more consistent across ports.

Figure 5:
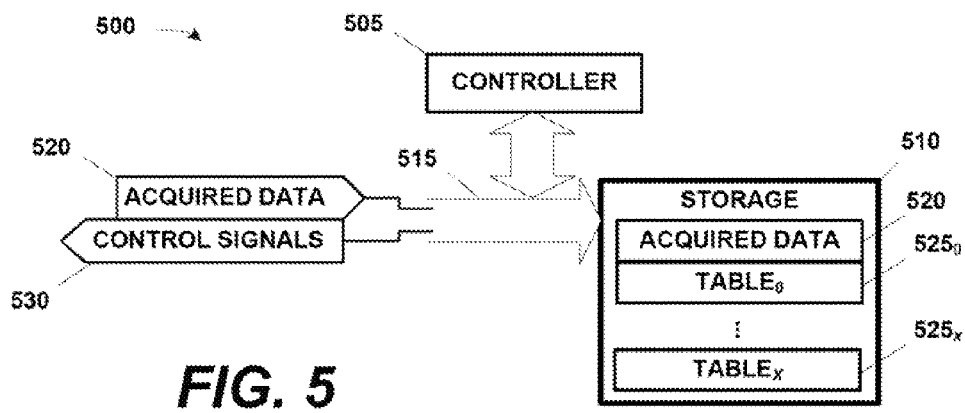
FIG. 5 generally illustrates one particular implementation of the switch control of FIG. 1.

FIG. 5 generally illustrates one particular implementation 500 of the switch control 120 of FIG. 1. The implementation 500 includes a controller 505, which may be implemented in hardware, software, or some combination thereof.

The implementation 500 generally includes some kind of storage 510, the nature of which will be implementation specific. It may be, for example, read-only in some embodiments while it may be random-access in others. It may be used to buffer the acquired data 520 and/or store the tables $525_0$-$525_x$ used as described above. (The acquired data 520, in this embodiment, comprises the instantaneous current and voltage of the resonant AC link 110.) The implementation 500 also includes some kind of bus system 515 or other means for communicating among the various elements of the AC link converter 100. The acquired data 520 may be received and the control signals 530 may be transmitted over the bus system 515' as shown. The control signals 530 comprise the signals used to control whether the switches are open or closed.

Figure 6A:
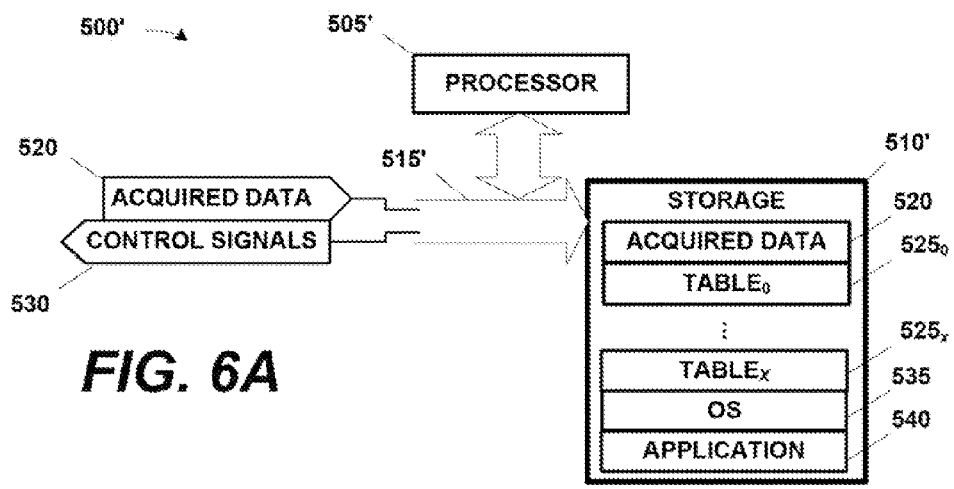
FIG. 6A-FIG. 6B depict two alternative implementations of the switch control of FIG. 5.

FIG. 6A depicts one particular implementation of the switch control 120 that is generally illustrated in FIG. 5. In the implementation 500', the controller 500 is implemented using a programmed processor 505' communicating with a storage 510' over a bus system 515'. The processor 505' need not possess high levels of computing power and so may be implemented using, for example, a microcontroller. However, more powerful processors may also be used if desired. The storage is encoded with an operating system ("OS") 535 and an application 540. The functionality of the process discussed relative to FIG. 3 is performed by the application 540 in this embodiment when invoked by the processor 505' over the bus system 515'.

In this particular embodiment, the acquired data 520 is buffered in the storage 510', although some embodiments, including some processor-based embodiments, may omit such buffering. However, as those skilled in the art will appreciate that such an application mitigates for storage technologies such as flash memory that have fast access times. In contrast, it will typically be desirable to store the tables $525_0$-$525_x$ in some kind of read only memory. As noted above, the storage 510' can comprise different kinds of memory that may be implemented using different kind of storage technologies.

Note that, at least in some embodiments, some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like, It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the invention are typically encoded on some form of program storage medium or implemented over some type of transmission medium. The program storage medium may be magnetic (e.g., a floppy disk or a hard drive) electronic (e.g., NAND flash), or optical (e.g., as compact disk read only memory, or "CD ROM"), and may be read only, read/write, or random access. Similarly, the transmission medium may be twisted wire pairs, coaxial cable, optical fiber, or some other suitable transmission medium known to the art. The invention is not limited by these aspects of any given implementation.

Figure 6B:
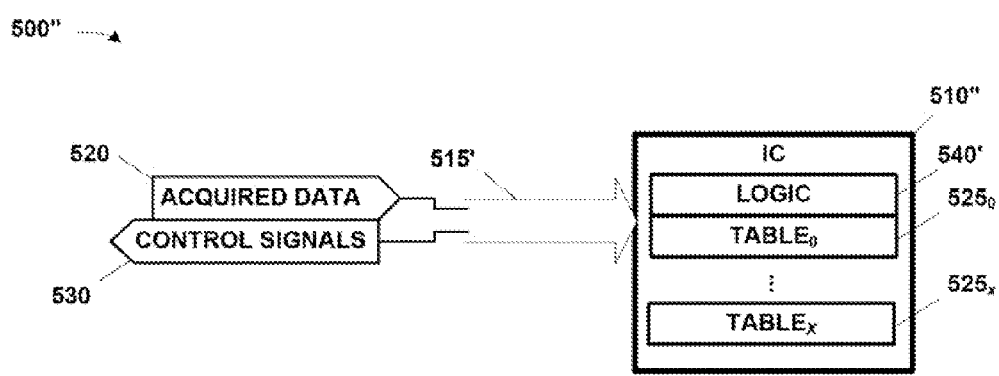

FIG. 6B depicts a second particular implementation of the switch control 120 that is generally illustrated in FIG. 5, this implementation being alternative to that shown in FIG. 6A. In this embodiment, the switch control 120 is implemented in an appropriately programmed integrated circuit 500". The integrated circuit 500" may be, for example, a programmed field programmable gate array ("FPGA") or an application specific integrated circuit ("ASIC"). As shown in FIG. 6B, it may be programmed with the logic 540' for performing the process described relative to FIG. 3 and the tables $520_0$-$520_x$. Those in the art will appreciate that the storage functionality of the integrated circuit 500" will be nominally read only because its content cannot be overwritten during operation. Thus, the acquired data 520 received over the bus 515" is not buffered.

Figure 7:
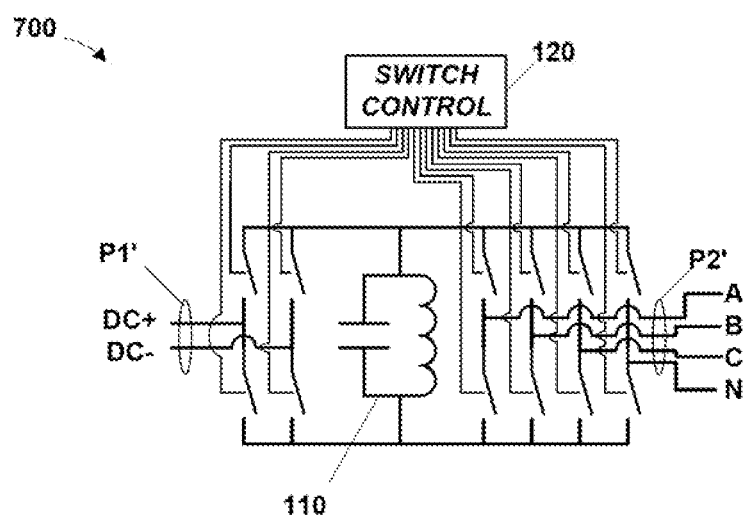
FIG. 7 depicts an embodiment of an AC link converter alternative to that shown in FIG. 1.

Returning now to FIG. 1, as previously noted, other embodiments may perform other kinds of conversions. One such embodiment is shown in FIG. 7. The embodiment 700 in FIG. 7 converts a DC input (at port P1') to a three phase output (at port P2'). Those in the art will appreciate that the sequencing and timing of the switch operation will vary depending on the input and the output. Hence, the use of the tables as described above that will be indexed according to the conversion being performed to define the correct sequence and timing for the switch operation.

From an abstract perspective, the switch logic 120, first shown in FIG. 1, operates the AC link converter 100 according to a state machine. Each "state" has switch combinations, etc. that define that state. The tables 305, 306, and 307, shown in FIG. 3, which are parts of switch logic 120 organize those states into valid sequences, and the switch engine 215, shown in FIG. 2, selects the appropriate sequence based on the energy transfers which should occur.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A multiport alternating current (AC) link converter, comprising:
   a resonant AC link;
   an input port;
   an output port;
   a plurality of switches, a first subset of which are between the input port and the resonant AC link and a second subset of which are between the resonant AC link and the output port; and
   a switch control configured to:
      determine an input port energy transfer amount and an output port energy transfer amount based at least in part on measured errors caused by one of a moving reference and a load that affects output voltage levels;
      access an input port sequence table associated with the input port and, based at least in part on the input port energy transfer amount, select a particular input switch sequence of a plurality of different input switch sequences from the input port sequence table;
      access an output port sequence table associated with the output port and, based at least in part on the output port energy transfer amount, select a particular output switch sequence of a plurality of different output switch sequences from the output port sequence table;
      based on the particular input switch sequence, initiate a sequence of opening and closing switches in the first subset of switches; and
      based on the particular output switch sequence, initiate a sequence of opening and closing switches in the second subset of switches.

2. The multiport AC link converter of claim 1, wherein the switch control is further configured to, for each link cycle of a plurality of link cycles:
   determine a new input port energy transfer amount and a new output port energy transfer amount;
   access the input port sequence table associated with the input port and, based at least in part on the new input port energy transfer amount, select a new input switch sequence of the plurality of different input switch sequences from the input port sequence table;
   access the output port sequence table associated with the output port and, based at least in part on the new output port energy transfer amount, select a new output switch sequence of the plurality of different output switch sequences from the output port sequence table;
   based on the new input switch sequence, initiate a sequence of opening and closing switches in the first subset of switches; and
   based on the new output switch sequence, initiate a sequence of opening and closing switches in the second subset of switches.

3. The multiport AC link converter of claim 1, wherein the switch control embodies a modular architecture.

4. The multiport AC link converter of claim 1, wherein the switch control comprises:
   a processor;
   a bus system; and
   a storage communicating with the processor over the bus system.

5. The multiport AC link converter of claim 1, wherein the switch control comprises an integrated circuit.

6. The multiport AC link converter of claim 5, wherein the integrated circuit comprises a programmed field programmable gate array.

7. The multiport AC link converter of claim 5, wherein the integrated circuit comprises an application specific integrated circuit.

8. The multiport AC link converter of claim 1, wherein the switch control is further configured to:
- access an input port voltage comparison table, and based at least in part on the input port energy transfer amount, select a particular input switch voltage sequence of a plurality of different input switch voltage sequences; and
- wherein progressing through the sequence of opening and closing switches in the first subset of switches is based at least in part on voltage comparisons made based on the particular input switch voltage sequence.

9. A multiport alternating current (AC) link converter, comprising:
- a resonant AC link;
- an input port;
- an output port;
- a plurality of switches, a first subset of which are between the input port and the resonant AC link and a second subset of which are between the resonant AC link and the output port; and
- means for:
  - determining an input port energy transfer amount and an output port energy transfer amount based at least in part on measured errors caused by one of a moving reference and a load that affects output voltage levels;
  - accessing an input port sequence table associated with the input port and, based at least in part on the input port energy transfer amount, selecting a particular input switch sequence of a plurality of different input switch sequences from the input port sequence table;
  - accessing an output port sequence table associated with the output port and, based at least in part on the output port energy transfer amount, selecting a particular output switch sequence of a plurality of different output switch sequences from the output port sequence table;
  - based on the particular input switch sequence, initiating a sequence of opening and closing switches in the first subset of switches; and
  - based on the particular output switch sequence, initiating a sequence of opening and closing switches in the second subset of switches.

10. The multiport AC link converter of claim 9, wherein the means comprises:
- a processor;
- a bus system; and
- a storage communicating with the processor over the bus system.

11. The multiport AC link converter of claim 9, wherein the means comprises an integrated circuit.

12. A method for operating a multiport alternating current (AC) link converter, comprising:
- determining an input port energy transfer amount associated with an input port and an output port energy transfer amount associated with an output port based at least in part on measured errors caused by one of a moving reference and a load that affects output voltage levels;
- accessing an input port sequence table associated with the input port and, based at least in part on the input port energy transfer amount, selecting a particular input switch sequence of a plurality of different input switch sequences from the input port sequence table;
- accessing an output port sequence table associated with the output port and, based at least in part on the output port energy transfer amount, selecting a particular output switch sequence of a plurality of different output switch sequences from the output port sequence table;
- based on the particular input switch sequence, initiating a sequence of opening and closing switches in the first subset of switches; and
- based on the particular output switch sequence, initiating a sequence of opening and closing switches in the second subset of switches.

13. The method of claim 12, further comprising acquiring an instantaneous current and a voltage of a resonant AC link.

* * * * *